Nov. 25, 1930.    L. W. SHELHAMER    1,782,667
TRUCK LOAD SECTIONS OR TRAYS
Filed Dec. 19, 1928    2 Sheets-Sheet 1
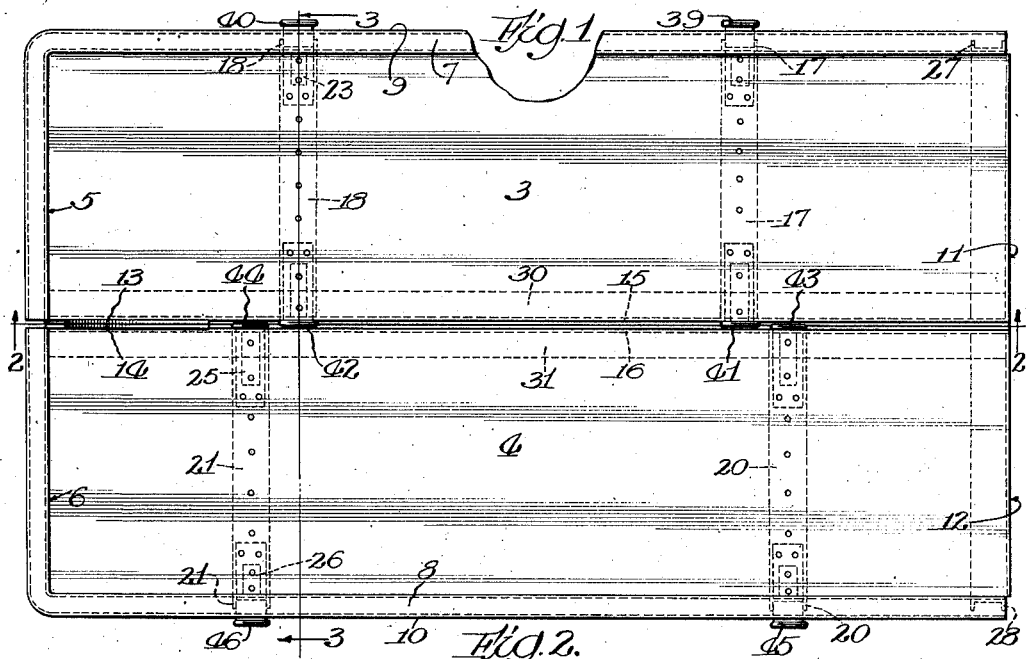
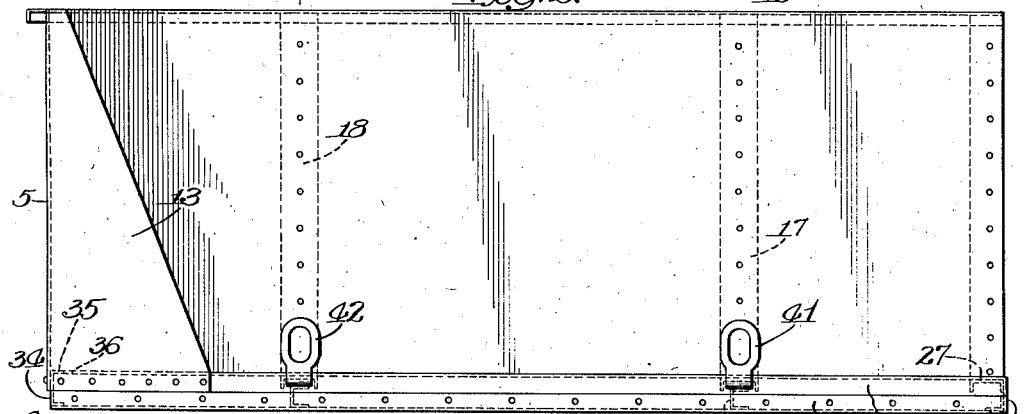
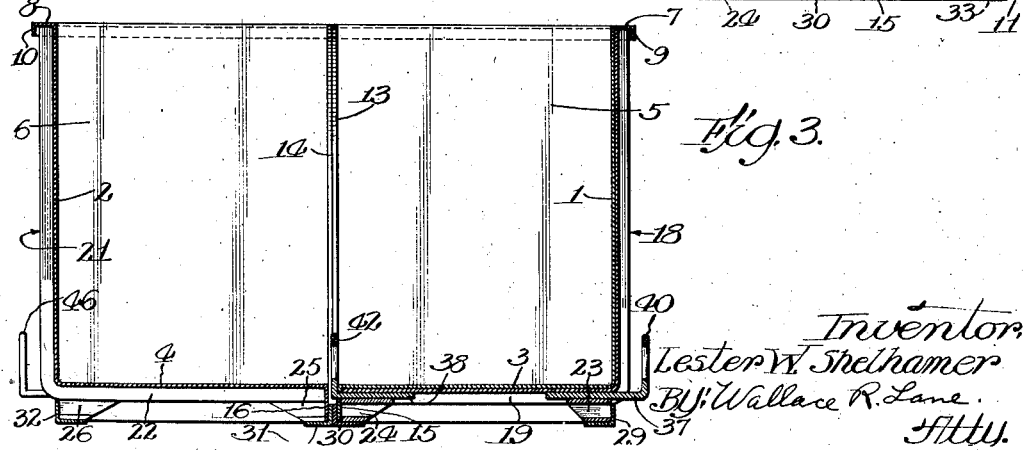
Inventor
Lester W. Shelhamer
By Wallace R. Lane.
Atty.

Nov. 25, 1930.  L. W. SHELHAMER  1,782,667
TRUCK LOAD SECTIONS OR TRAYS
Filed Dec. 19, 1928   2 Sheets-Sheet 2
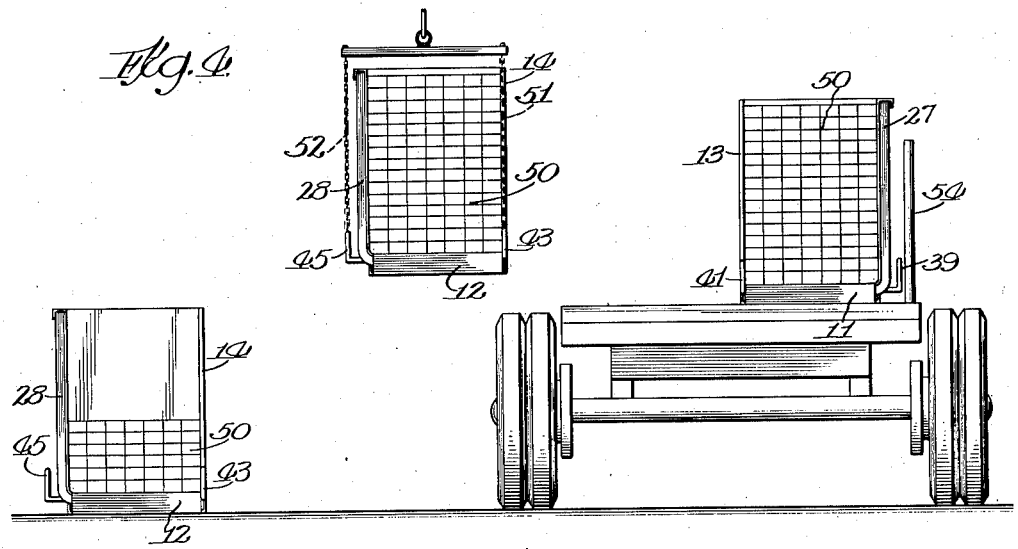
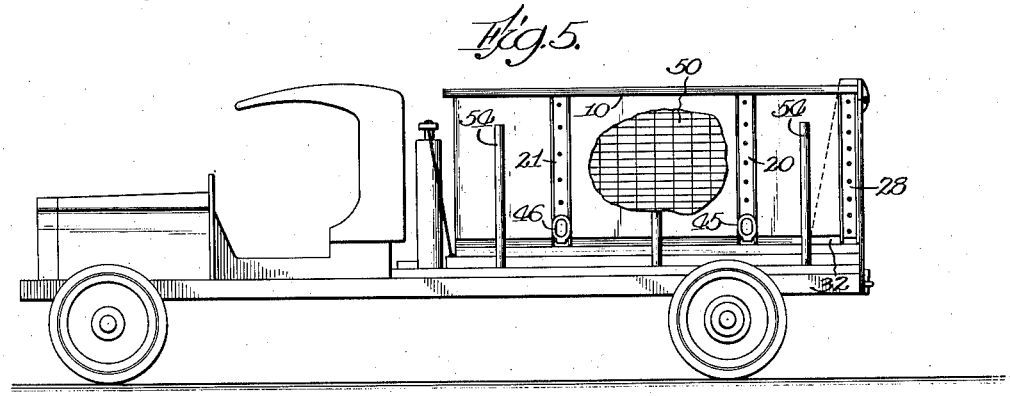
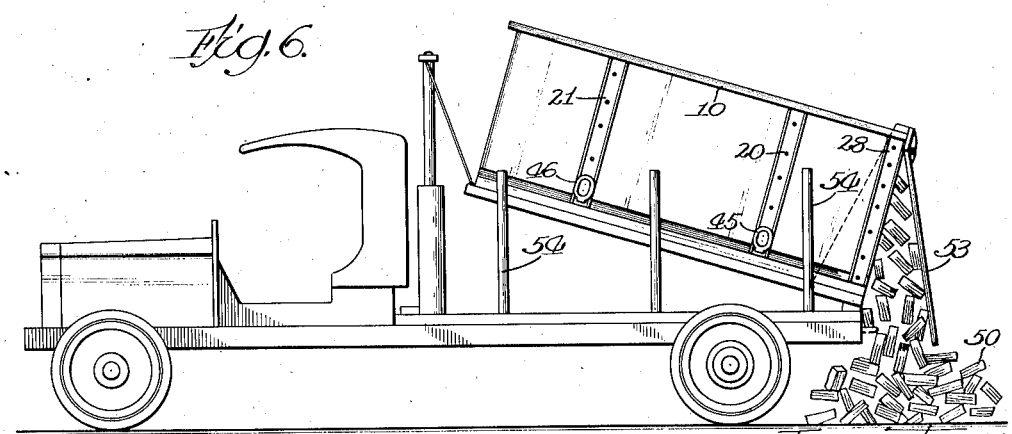

Patented Nov. 25, 1930

1,782,667

UNITED STATES PATENT OFFICE

LESTER W. SHELHAMER, OF OAK PARK, ILLINOIS

TRUCK-LOAD SECTIONS OR TRAYS

Application filed December 19, 1928. Serial No. 326,991.

The present invention relates to truck load receptacles and has reference more particularly to the sections or trays, which when on a truck, will form the receptacle or body thereof.

Among the objects of the invention is to provide novel sections or trays capable of removal from the truck and placed at a locus of supply or production where the objects or articles to be loaded may be piled on the tray or section, while the truck is being otherwise used, and then, by use of a crane or the like, raise the trays and place them on a truck. Usually the trays are in pairs, each having a bottom, a side wall, and an end wall. The open sides of the pair are opposite each other when the trays are placed together on a truck. The open ends are in the same plane and located adjacent the end gate on the truck, so that the end gate will act as an end wall for the trays when on the truck, and yet when the truck is tilted, the end gate can swing to permit the dumping of the contents of the trays, the trays still being retained on the truck. The trays may be made from sheet metal of desired thickness and the side, end and bottom walls, suitably reinforced as by angle or channel iron pieces, and gussets as necessary or found desirable.

Suitable means, such as eyes may be secured to the trays, preferably at the sides thereof and in staggered relation, for connection thereto of a lifting means, such as the hooks of crane chains or the like. The reinforcing elements and the attaching means are so located as to be in staggered and noninterfering relation when the trays or sections are placed together side by side with their open sides adjacent or opposite each other.

Other objects, advantages, capabilities and features are comprehended by the invention as will later appear, and as are inherently possessed thereby.

Referring to the drawings:

Fig. 1 is a top plan view of a pair of trays located side by side;

Fig. 2 is a side view in elevation of one of the trays, from the open side thereof;

Fig. 3 is a transverse sectional view of a pair of trays, and taken in a plane represented by line 3—3 in Fig. 1 of the drawings;

Fig. 4 is a view showing a truck with a tray in position thereon, a tray in the process of being lifted either in the truck, or to be placed upon the truck, and a tray partly loaded, and before being ready for lifting upon a truck;

Fig. 5 is a side view of a truck with loaded trays thereon; and

Fig. 6 is a similar view of a truck in dumping position, showing the position of the trays and the cooperation of the end gate at the time of dumping.

Referring more in detail to the drawings, the embodiment selected to illustrate the invention is shown in the form of a pair of trays made from sheet metal and having side walls 1 and 2, bottom walls 3 and 4, and end walls 5 and 6. The side and end walls are preferably formed at their upper ends with flanges 7, 8, 9 and 10, these flanges forming a sort of channel rim. At the open end of the trays, the floor or bottoms 3 and 4 have depending end flanges 11 and 12. At the opposite end of the trays, the end walls 5 and 6 have extensions which are bent from the end walls and provide substantially triangular portions forming gussets 13 and 14, the end walls 5 and 6 and the gussets 13 and 14 extending below the bottoms 3 and 4. This is clearly shown at the left hand end of Fig. 2 of the drawings. At the open side of the trays, the bottoms 3 and 4 continue with depending flanges 15 and 16 clearly shown in Fig. 3.

The walls and bottom of the trays are suitably reinforced by angle and channel irons. To the side wall 1 and bottom wall 3 are secured channel iron reinforcing members 17 and 18, having vertical legs secured to the side wall 1 as by rivets or other suitable securing means, and extending upwardly into the channel of the flanges 7 and 9, and a horizontal leg 19 passing under and secured to the bottom wall 3. Likewise, side wall 2 and bottom wall 4 has similar reinforcing channel members 20 and 21 having upright legs secured to the side wall 2 by suitable securing elements, such as rivets and the like, and extending into the channel of the flanges 8 and 10, and having a horizontal leg 22 beneath the floor 4 and secured thereto by suitable securing elements. Between the legs 19 and 22 of these reinforcing members and secured thereto, are provided supporting elements 23, 24, 25 and 26, these supporting elements being in the form of channel irons and located near the edges of the bottoms 3 and 4, or near the ends of the horizontal legs 19 and 22 of the reinforcing members.

At the open ends of the trays may also be provided end reinforcing members in the form of channel irons 27 and 28, also having upright legs secured to the side walls and horizontal legs secured to the under surface of the bottoms of these trays.

Beneath the bottom may also be provided angle irons 29, 30, 31 and 32 extending longitudinally of the trays and secured to supporting members 23, 24, 25 and 26. The angle members or irons 30 and 31 are also secured to the depending flanges 15 and 16 of the bottoms 3 and 4. Transversely below the bottoms are also provided reinforcing angle irons 33 at the open ends of the trays, and suitably secured to the longitudinal angle irons 29, 30, 31 and 32. See the lower right hand corner of Fig. 2. At the other end of the trays, that is at the closed ends, are provided transverse channel irons 34, with the lower flange of the channel secured to the lower flanges of the longitudinal angle irons 29, 30, 31 and 32, and the upper flange 35 of these transverse channel irons 34, abutting with the ends 36 of the bottoms 3 and 4. See the lower left hand corner of Fig. 2. It will be noted that the lower end portions of the end walls 5 and 6, and gussets 13 and 14, extend below the bottoms 3 and 4 and are secured by suitable securing elements to these channel irons 34 and the depending flanges 15 and 16 of the bottoms.

For the purpose of being able to lift the trays by a crane or the like, suitable eyes are provided and secured to the reinforcing members 17, 18, 20 and 21. These eyes comprise horizontal legs 37 and 38 located between the webs of the horizontal legs 19 and 22 of the reinforcing channels and the supporting members 23, 24, 25 and 26, and upright members or portions 39, 40, 41, 42, 43, 44, 45 and 46 having openings therein for the reception of hooks.

It will be noted that these eyes have their upright portions suitably spaced laterally from the side walls 1 and 2 of the trays, whereby hooks may be properly engaged therewith, and have the points of the hooks in the space between them and the side walls. At the open sides of the trays, the upright portions of the eyes are not spaced in the same way, but it will be noted from Fig. 1 that these are staggered, that is, the eyes 43 and 44 are in staggered noninterfering relation with eyes 41 and 42. This provides for placing hooks through these eyes, such as eyes 41 and 42, when it is desired to lift the tray carrying these eyes independently of lifting the other tray. Likewise, when the hooks are placed in the eyes 43 and 44, the tray carrying these eyes may be lifted independently of the other trays. An important object of this invention is to have these trays located at a manufacturing plant of the like, so that the workman may load each tray independently with manufactured products, such as bricks 50, while the trucks are otherwise engaged or traveling over the road at some other point. During this time, the truck is not waiting for the loading thereof. When the truck arrives for taking the load, a crane will lift the tray, such crane being provided with suitable crane chains 51 and 52, and hooks to engage in the eyes of a tray. A lifted tray is shown in the middle of Fig. 4. The crane may then move the tray to the truck and locate it thereon in proper position, after which the chains may be unhooked from the tray. The trays are made in pairs so that when they are placed upon the truck, the open sides of the trays will be opposite each other, and the closed ends of the trays will be at the forward end of the truck. The open ends of the trays will be at the rear end and adjacent the end gate.

The end gate is of the usual form, which may swing from an upper axis and may be locked in closed position opposite the open ends of the trays during transportation, and then when ready for dumping, the end gate, such as gate 53 shown in Fig. 6, will be adapted to swing when the truck body is lifted to dump the contents of the trays through the open ends of such trays. If desired, the truck may have stakes 54 at the sides to prevent side shifting of the trays.

While I have herein described and upon the drawings shown an illustrative embodiment of the invention, it is to be understood that the invention is not limited thereto, but may comprehend other constructions, details, arrangements of parts and features without departing from the spirit thereof.

Having thus disclosed the invention, I claim:

1. A material handling device comprising a pair of independently movable truck load sections each of which is constructed with a bottom wall, one end wall and one side wall, so that each section will support an independent load, said sections being arranged side by side and having open sides disposed adjacent to each other, so that the sections provide a single material containing enclosure open at one end, the end walls of said sections being in approximate alignment, so that the loads carried by the sections may be simultaneously discharged through the said open end by tilting said sections.

2. A material handling device of the character described comprising a pair of independently movable truck load sections arranged side by side, each section being constructed with a bottom wall, an end wall and a side wall so that each section will support an independent load, said sections being arranged side by side and having open sides disposed adjacent each other so that the sections provide a single material containing enclosure open at one end, each open side being partially covered by a bent portion formed integrally with the end wall of the section, said end walls being in approximate alignment so that the loads carried by said sections may be simultaneously discharged through the said open end by tilting said sections.

3. A material handling device comprising a pair of independently movable truck load sections each constructed with a bottom wall, an end wall and a side wall so that each section will support an independent load, said sections being arranged side by side and having open sides disposed adjacent to each other so that the sections provide a single material containing enclosure open at one end, said open sides being partially covered by bent portions integral with the end walls of the respective sections, said end walls being in approximate alignment, so that the sections may be simultaneously discharged through the said open end by tilting said sections, the end walls and said integral bent portions extending below the respective bottom walls, said bottom walls being provided with depending flanges adjacent to the open sides and the open ends of the respective sections.

4. A material handling device comprising a pair of independently movable truck load sections each of which is constructed with a bottom wall, one end wall and one side wall, so that each section will support an independent load, said sections being arranged side by side and having open sides disposed adjacent to each other, so that the sections provide a single material containing enclosure open at one end, the end walls of said sections being in approximate alignment, so that the loads carried by the sections may be simultaneously discharged through the said open end by tilting said sections, reenforcing members secured to the side and bottom walls of each of said sections, the reenforcing members of one section being in staggered relation with respect to the reenforcing members of the other section.

5. A material handling device comprising a pair of independently movable truck load sections each of which is constructed with a bottom wall, one end wall and one side wall, so that each section will support an independent load, said sections being arranged side by side and having open sides disposed adjacent to each other, so that the sections provide a single material containing enclosure open at one end, the end walls of said sections being in approximate alignment, so that the loads carried by the sections may be simultaneously discharged through the said open end by tilting said sections, reenforcing members secured to the side and bottom walls of each of said sections, the reenforcing members of one section being in staggered relation with respect to the reenforcing members of the other section, and eyes secured to the lower parts of the respective reenforcing members, a portion of said eyes extending parallel with and spaced from the side walls of the respective sections, the remaining eyes being disposed opposite the respective open sides.

6. The combination with a truck comprising a body provided with a tail gate, of a pair of independently movable truck load sections, each of which is constructed with a bottom wall, one end wall and one side wall, so that each section will support an independent load, said sections being arranged side by side and having open sides disposed adjacent to each other, so that the sections provide a single material containing enclosure open at one end, said open end being normally closed by said tail gate, the end walls of said sections being in approximate alignment, so that the loads carried by the sections may be simultaneously discharged through the said open end by tilting said sections.

In witness whereof, I hereunto subscribe my name to this specification.

LESTER W. SHELHAMER.